United States Patent
Inoue (10) Patent No.: US 9,456,092 B2
(45) Date of Patent: Sep. 27, 2016

(54) IMAGE COMMUNICATING APPARATUS, CONTROL METHOD THEREFOR, AND STORAGE MEDIUM STORING PROGRAM

(71) Applicant: CANON KABUSHIKI KAISHA, Tokyo (JP)

(72) Inventor: Yutaka Inoue, Tokyo (JP)

(73) Assignee: CANON KABUSHIKI KAISHA, Tokyo (CN)

( * ) Notice: Subject to any disclaimer, the term of this patent is extended or adjusted under 35 U.S.C. 154(b) by 0 days.

(21) Appl. No.: 14/621,572

(22) Filed: Feb. 13, 2015

(65) Prior Publication Data

US 2015/0249758 A1    Sep. 3, 2015

(30) Foreign Application Priority Data

Mar. 3, 2014  (JP) .................. 2014-041051

(51) Int. Cl.
*H04M 11/00*  (2006.01)
*H04N 1/00*  (2006.01)

(52) U.S. Cl.
CPC .......... *H04N 1/00312* (2013.01); *H04N 1/001* (2013.01)

(58) Field of Classification Search
CPC .................. H04N 1/00312; H04N 1/32074; H04N 1/0022
See application file for complete search history.

(56) References Cited

U.S. PATENT DOCUMENTS

| | | | |
|---|---|---|---|
| 5,175,746 A | 12/1992 | Inoue et al. | 375/13 |
| 5,420,884 A | 5/1995 | Inoue | 375/229 |
| 6,078,652 A * | 6/2000 | Barak | H04M 15/00 379/114.02 |
| 6,836,541 B2 | 12/2004 | Inoue et al. | 379/212.01 |
| 8,781,088 B2 * | 7/2014 | Nakayama | H04N 1/32074 370/230 |
| 2004/0051900 A1 | 3/2004 | Sagiya et al. | 358/1.15 |

FOREIGN PATENT DOCUMENTS

JP    2004-112182 A    4/2004

* cited by examiner

Primary Examiner — Stella L Woo
(74) Attorney, Agent, or Firm — Fitzpatrick, Cella, Harper & Scinto (57) ABSTRACT

An image communicating apparatus capable of transmitting/receiving image data via a high-speed digital line network determines whether a transmission destination device is busy. If it is determined that the transmission destination device is busy, the image communicating apparatus redials the transmission destination device a preset number of times. If it cannot be determined that the transmission destination device is busy and transmission has not ended normally, the image communicating apparatus redials the transmission destination device by limiting a redial count.

8 Claims, 9 Drawing Sheets

```
INVITE sip:bob@example.com SIP/2.0
Via: SIP/2 0/UDP pc33.abc.co.jp branch=z9hG4bKnashds8
Max-Forwards: 70
To: Bob  <sip:bob@example.com>
From: Alice  <sip:alice@abc.co.jp>;tag=1928301774
Call-ID: a81b4c76e66710@pc33.abc.co.jp
CSeq: 314159 INVITE
Contact:<sip:alice@pc33.abc.co.jp>
Conten-Typei application/sdp
Content-Lenth: 153 v=0
o=alice 53655765 2353687637 IN IP4 pc33.abc.co.jp
s=-
t=0 0
m=audio 5004 RTP/AVP 0
a=rtpmap:8 PCMU/8000
```

FIG. 7

```
INVITE sip:bob@example.com SIP/2.0
Via: SIP/2 0/UDP pc33.abc.co.jp branch=z9hG4bKnashds8
Max-Forwards: 70
To: Bob <sip:bob@example.com>
From: Alice <sip:alice@abc.co.jp>;tag=1928301774
Call-ID: a81b4c76e66710@pc33.abc.co.jp
CSeq: 314159 INVITE
Contact:<sip:alice@pc33.abc.co.jp>
Conten-Typei application/sdp
Content-Lenth: 153 v=0
o=alice 53655765 2353687637 IN IP4 pc33.abc.co.jp
s=-
t=0 0
m=image 30000 TCP t38
```

IMAGE COMMUNICATING APPARATUS, CONTROL METHOD THEREFOR, AND STORAGE MEDIUM STORING PROGRAM

BACKGROUND OF THE INVENTION

1. Field of the Invention

The present invention relates to an image communicating apparatus, a control method therefor, and a storage medium storing a program therefor.

2. Description of the Related Art

In addition to facsimile (to be referred to as FAX hereinafter) transmission using a PSTN (Public Switched Telephone Network), there is provided FAX transmission using a network (IP network). FAX transmission using the IP network is defined by T.38 of ITU-T recommendation. In this FAX transmission, a digital signal transmitted according to the conventional T.30 protocol is transmitted intact, thereby implementing higher-speed transmission, as compared with T.30. SIP (Session Initiation Protocol) is used as a call control protocol for the FAX transmission to implement Point-to-Point communication on the IP network. There is also known a technique of implementing FAX transmission by G3 FAX transmission between the IP network and the PSTN via a VoIP GW (Voice over IP GateWay) having a conversion function between the T.38 procedure and the T.30 procedure.

In the general configuration of a communication system via the IP network and the PSTN, a communication apparatus on the transmission side is connected to the IP network, and performs FAX transmission according to the T.38 procedure. At this time, the communication apparatus issues a SIP calling signal to the VoIP GW via the IP network. Upon receiving the signal, the VoIP GW specifies a connection partner, calls and connects a communication apparatus as a transmission partner via the PSTN, and performs FAX transmission along a path "transmission source communication apparatus—IP network—VoIP GW—PSTN—transmission destination communication apparatus". In this case, FAX transmission is performed between the transmission source communication apparatus and the VoIP GW according to a T.38 digital transmission procedure. The VoIP GW converts the T.38 procedure into the analog T.30 procedure, and T.30 as a G3 FAX procedure is executed between the VoIP GW, the PSTN, and the transmission destination communication apparatus.

Figure 8:
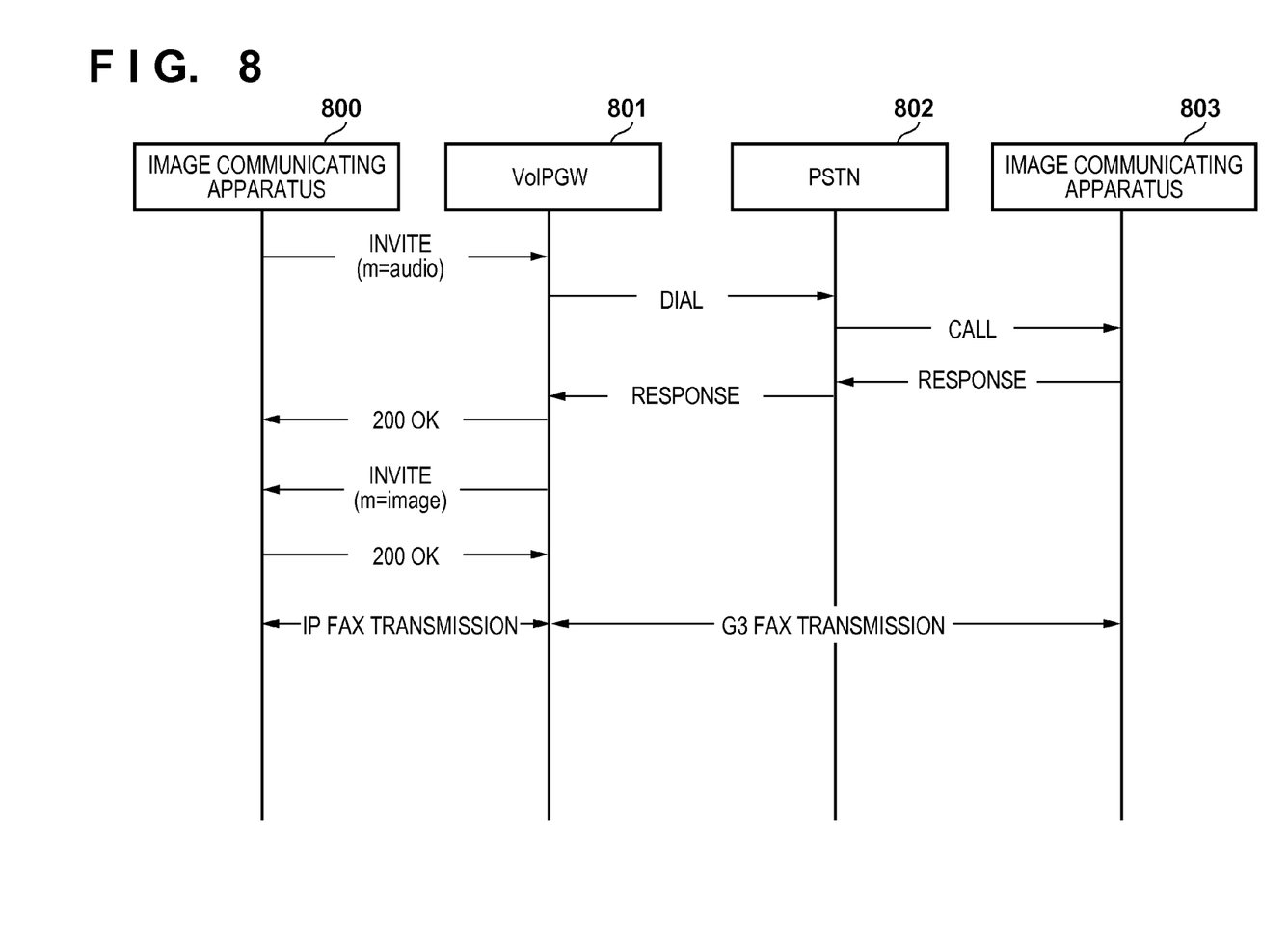
FIG. 8 is a sequence chart showing a procedure along a path "transmission source communication apparatus—IP network—VoIP GW—PSTN—transmission destination communication apparatus"

FIG. 8 is a sequence chart for explaining a procedure along the path "transmission source communication apparatus—IP network—VoIP GW—PSTN—transmission destination communication apparatus". As a call connection procedure before such transmission is performed, some VoIP GW makers perform connection by a call for voice transmission and then perform reconnection by a call for image transmission. FIG. 8 shows this procedure.

A transmission source communication apparatus 800 transmits a SIP INVITE signal as a call connection signal to a VoIP GW 801 via the IP network. The INVITE signal includes a parameter representing the type of data to be transmitted, which is called a medium. In this example, m=audio is set, that is, call connection for voice transmission is requested. Upon receiving the signal, the VoIP GW 801 dials a PSTN 802 to send a call signal to a transmission destination communication apparatus 803. In response to this, the communication apparatus 803 sends a SIP 200 OK signal as a response signal to the communication apparatus 800 via the IP network. Upon receiving the signal, the communication apparatus 800 connects a call to the communication apparatus 803. This procedure temporarily ends the connection for voice transmission.

The VoIP GW 801 transmits a SIP INVITE signal with medium information indicating data (m=image) to the communication apparatus 800 to switch to a call for data communication. Upon receiving the signal, the communication apparatus 800 returns a SIP 200 OK signal, and connects a call for data communication. This completes call connection for FAX data communication. After that, communication between the communication apparatus 800 and the VoIP GW 801 is performed according to the T.38 procedure, and FAX communication between the VoIP GW 801 and the communication apparatus 803 is performed according to the T.30 procedure. Issuing an INVITE signal to change the characteristics of a session during the session in this way is called reINVITE.

Assume that the communication apparatus 800 has an automatic redial function. The automatic redial function is a function of automatically redialing to perform transmission at an interval set by the user the number of times set by the user when transmission abnormally ends or when a transmission destination communication apparatus is in use (busy). The communication apparatus 800 also includes a function called a count-limited redial function of limiting the redial count to one regardless of a user setting value depending on the type of a transmission destination device. When the transmission destination device is determined as a device other than a communication terminal, retransmission by redial is meaningless. The function prevents such an unnecessary redial, and is mainly standardized in North America and Korea.

Figure 9:
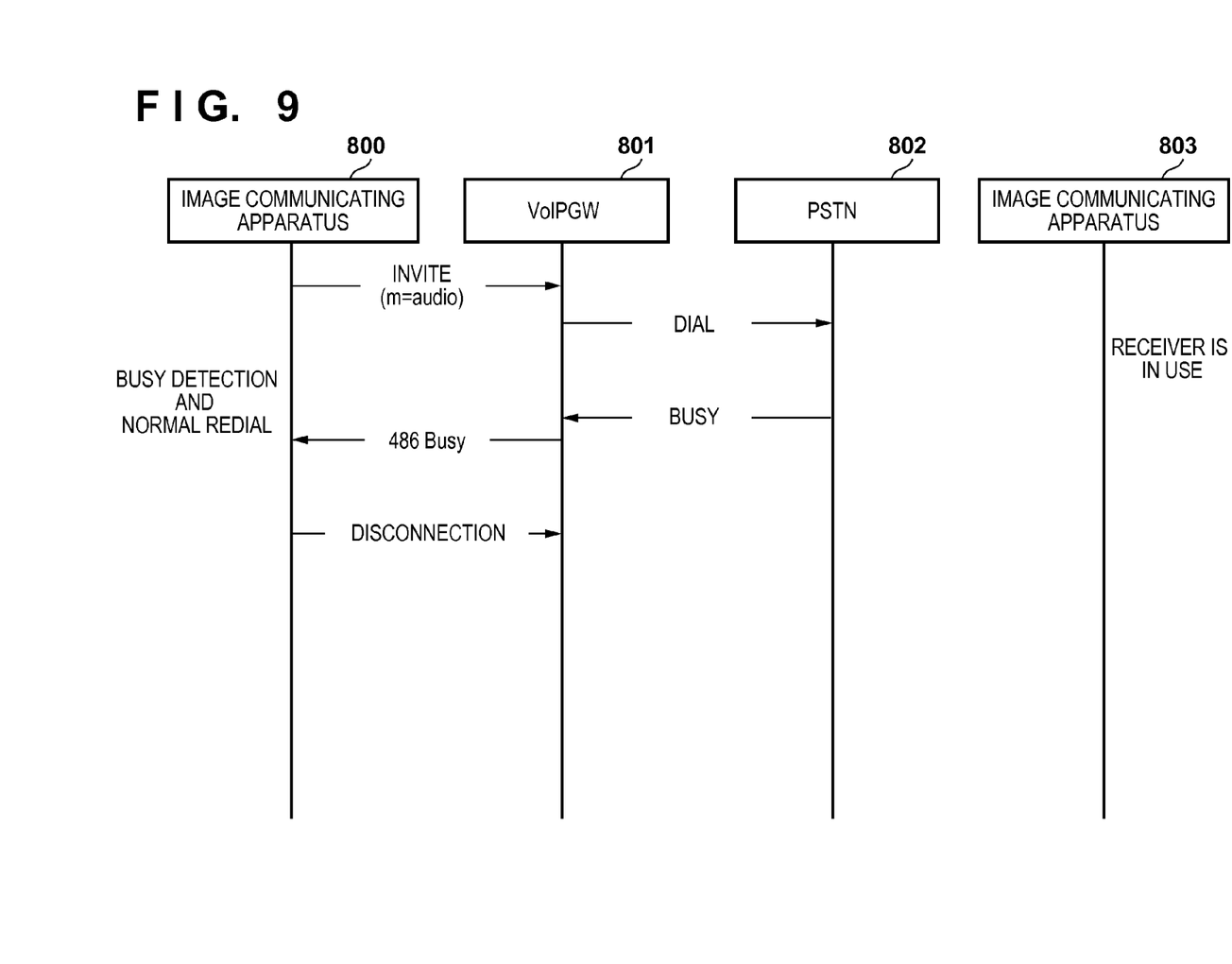
FIG. 9 is a sequence chart showing processing when the transmission destination device is busy in communication via the IP network, VoIP GW, and PSTN.

FIG. 9 is a sequence chart for explaining a processing sequence when a transmission destination device is busy in communication via the IP network, VoIP GW, and PSTN.

In this example, if communication abnormally ends during an IP FAX transmission phase, a FAX transmission procedure has already been performed with the transmission destination device, and the transmission destination device can thus be determined as a communication terminal. Therefore, the communication apparatus redials according to the normal automatic redial procedure instead of the count-limited redial function. In this case, since the process has transited to the FAX transmission procedure, it is possible to determine the transmission destination device as a communication terminal but a call may be disconnected at a call control stage. A representative example is a case in which the transmission destination device is in use (busy). If the transmission destination device is busy, the process has not transited to the FAX transmission procedure, and thus it is impossible to reliably determine whether the transmission destination device is a communication terminal. Since, however, the transmission destination device may be a communication terminal, the communication apparatus redials according to the normal automatic redial procedure instead of the count-limited redial function by regarding the transmission destination device as a communication terminal. Furthermore, if a call connection is established with the transmission destination device but the FAX procedure does not advance, it is possible to determine the transmission destination device is not a communication terminal, the count-limited redial function is performed at the time of redial.

Referring to FIG. 9, the transmission source communication apparatus 800 first sends a SIP INVITE signal with a medium: audio (m=audio). The VoIP GW 801 receives the signal, and dials the PSTN 802. If, however, the transmission destination device is in use, the PSTN 802 sends a busy signal (400-Hz intermittent sound). Upon receiving the signal, the VoIP GW 801 sends a SIP 486 busy signal to the communication apparatus 800. Upon receiving the signal, the communication apparatus 800 determines that the transmission destination device is in use and may be a communication terminal, and thus redials according to the normal automatic redial procedure instead of the count-limited redial function.

As a literature associated with redial using a SIP signal, for example, Japanese Patent Laid-Open No. 2004-112182 is disclosed. In Japanese Patent Laid-Open No. 2004-112182, a calling side is notified of a redial interval using a parameter Retry-After of a SIP 486 busy signal indicating that a transmission destination device is busy. Upon receiving the notification, the calling side controls an interval until a call is originated next time in accordance with the redial interval. However, Japanese Patent Laid-Open No. 2004-112182 discloses neither an error redial function nor a method for detecting that a partner device is busy other than a 486 busy signal.

As described above, the VoIP GW which connects a voice call with m=audio and then reconnects a data communication call (m=image) notifies by a method other than a SIP 486 busy signal that the transmission destination device is busy. For example, after a voice call is connected (a SIP 200 OK signal is sent), it is notified by, for example, a busy tone using a voice packet that the transmission destination device is busy. In this case, it is impossible to determine whether the transmission destination device is busy, and start the FAX procedure. As a result, the count-limited redial function unwantedly operates instead of the normal automatic redial function. This limits the redial count to one, thereby missing an opportunity to establish communication by retransmission.

SUMMARY OF THE INVENTION

An aspect of the present invention is to eliminate the above-mentioned problems with the conventional technology.

The present invention provides an image communicating apparatus in which even if a transmission destination device notifies by a method other than a SIP busy signal that it is busy, it is possible to determine whether the transmission destination device is busy, and redial according to the determination result, and a control method therefor.

The present invention in one aspect provides an image communicating apparatus capable of transmitting/receiving image data via a high-speed digital line network, comprising: a first redial unit configured to redial a transmission destination device a preset number of times; a second redial unit configured to redial the transmission destination device with a redial count being limited; a determination unit configured to determine whether the transmission destination device is busy; and a control unit configured to control to redial by the first redial unit in a case where the determination unit determines that the transmission destination device is busy, and to redial by the second redial unit in a case where the determination unit determines that the transmission destination device is not busy and transmission has not ended normally.

According to the present invention, even if a transmission destination device notifies by a method other than a SIP busy signal that it is busy, it is possible to determine whether the transmission destination device is busy, and redial according to the determination result.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same components and a description thereof will be omitted.

Figure 1:
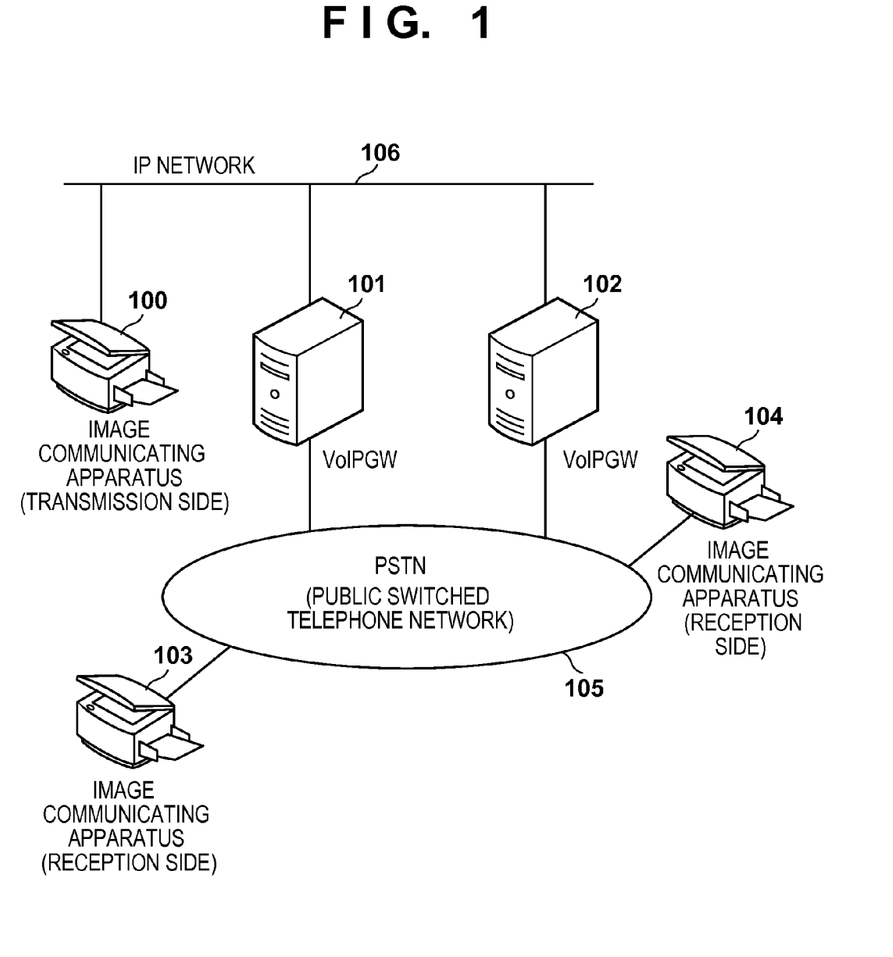
FIG. 1 is a view showing the configuration of a communication system via an IP network and PSTN.

FIG. 1 is a view for explaining the configuration of a communication system via an IP network and PSTN according to an embodiment.

Referring to FIG. 1, an image communicating apparatus 100 is a communication apparatus which is connected to an IP network 106 serving as a high-speed digital line network, and is capable of performing transmission according to the T.38 procedure. The image communicating apparatus 100 issues a calling signal to a VoIP GW 101 as a gateway using a signal of SIP as a call control protocol. Upon receiving the signal via the IP network 106, the VoIP GW 101 specifies a partner device, and calls and connects an image communicating apparatus 103 as a transmission destination device via a PSTN (Public Switched Telephone Network) 105. After connection, communication along a path "image communicating apparatus 100—IP network 106—VoIP GW 101—PSTN 105—image communicating apparatus 103" is performed. Digital transmission is performed between the image communicating apparatus 100 and the VoIP GW 101 according to the T.38 procedure. The VoIP GW 101 converts the T.38 procedure into the analog T.30 procedure, and G3 FAX transmission is executed between the VoIP GW 101, the PSTN 105, and the image communicating apparatus 103 according to the T.30 procedure.

Furthermore, a plurality of VoIP GWs can be prepared by adding a VoIP GW 102, and used according to the installation locations of the image communicating apparatus 103 and an image communicating apparatus 104 as connection destinations. If, for example, the image communicating apparatus 103 is installed in a Tokyo branch and the image communicating apparatus 104 is installed in an Osaka branch, the VoIP GW 101 is installed in Tokyo and the VoIP GW 102 is installed in Osaka. The IP network 106 whose communication fee is free (or low) is used for communication between the branches, and communication via the PSTN 105 which charges a communication fee is used for a local call, thereby lowering the total communication fee.

Figure 2:
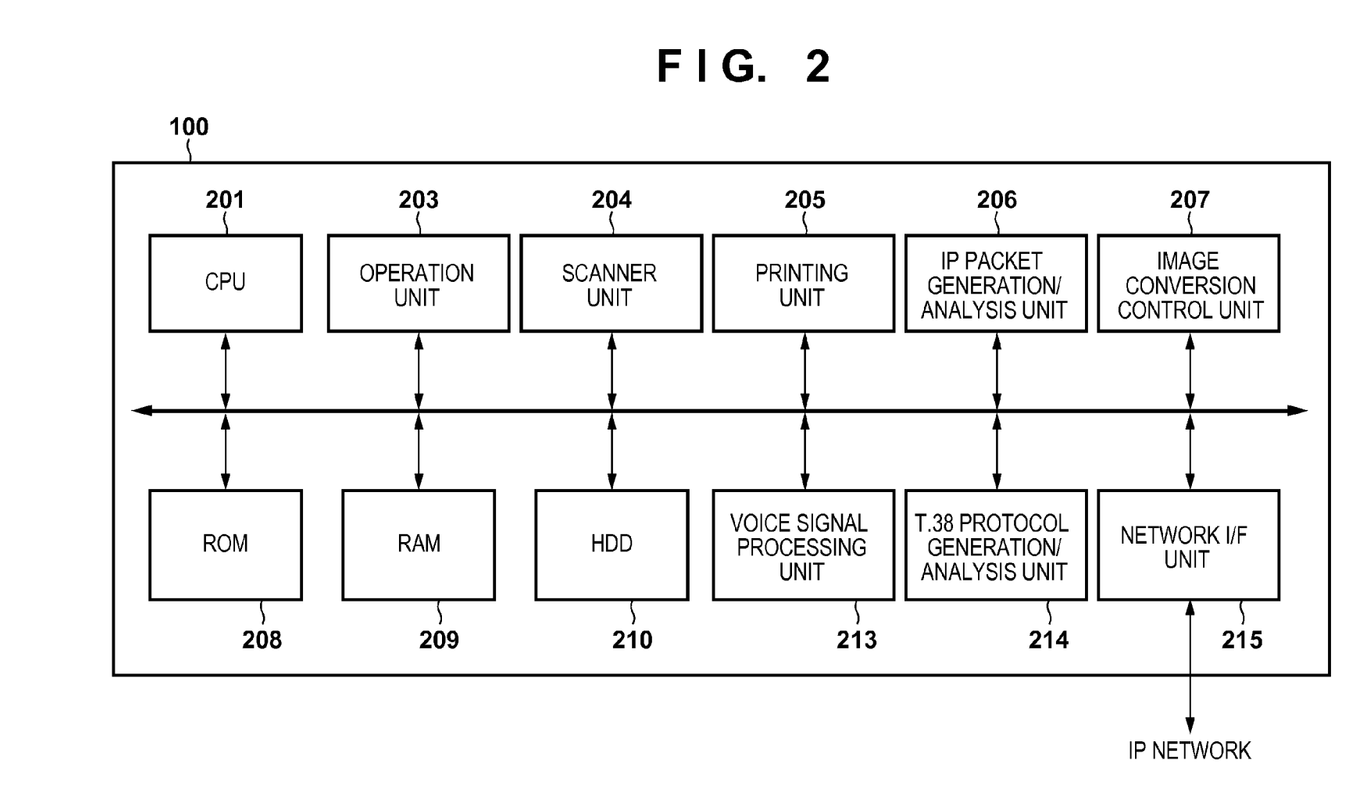
FIG. 2 is a block diagram showing the arrangement of an image communicating apparatus.

FIG. 2 is a block diagram for explaining the arrangement of the image communicating apparatus 100 according to the embodiment of the present invention. Note that each of the image communicating apparatuses 103 and 104 has the same arrangement.

A CPU 201 controls respective units (to be described later) of the image communicating apparatus 100 according to an OS and programs which are loaded from an HDD (Hard Disk Drive) 210 to a RAM 209 by a boot program stored in a ROM 208. An operation unit 203 includes a display unit and a key operation unit. The display screen of the display unit displays, for example, windows, icons, messages, menus, and other user interface information. Although not shown, the operation unit 203 includes various keys used by the user to perform copy, FAX, and printer operations, and a touch panel function used to instruct the icons, menus, and the like on the display screen. A scanner unit 204 reads a document, and outputs image data of the document. A printing unit 205 prints print data saved in the HDD 210. The ROM 208 holds various data and the boot program to be executed by the CPU 201. The RAM 209 provides a work area for the CPU 201, an area for saving data at the time of error processing, an area for loading control programs, and the like. The HDD 210 is used to save various control programs and print data. A T.38 protocol generation/analysis unit 214 generates facsimile transmission information by an ITU-T recommendation T.38 protocol, and reads out the facsimile transmission information from the received protocol. An IP packet generation/analysis unit 206 maps the ITU-T recommendation T.38 protocol to an IP packet, and reads out the ITU-T recommendation T.38 protocol from the received IP packet. An image conversion control unit 207 performs compression/decompression, scaling, and linear density conversion for an image to undergo FAX transmission/reception. A network I/F unit 215 is connected to the IP network 106, and transmits/receives a digital signal to/from the IP network 106. A voice signal processing unit 213 analyzes a voice packet received from the IP network 106.

The operation of the image communicating apparatus 100 according to the embodiment will be described with reference to the flowchart of FIG. 3.

Figure 3:
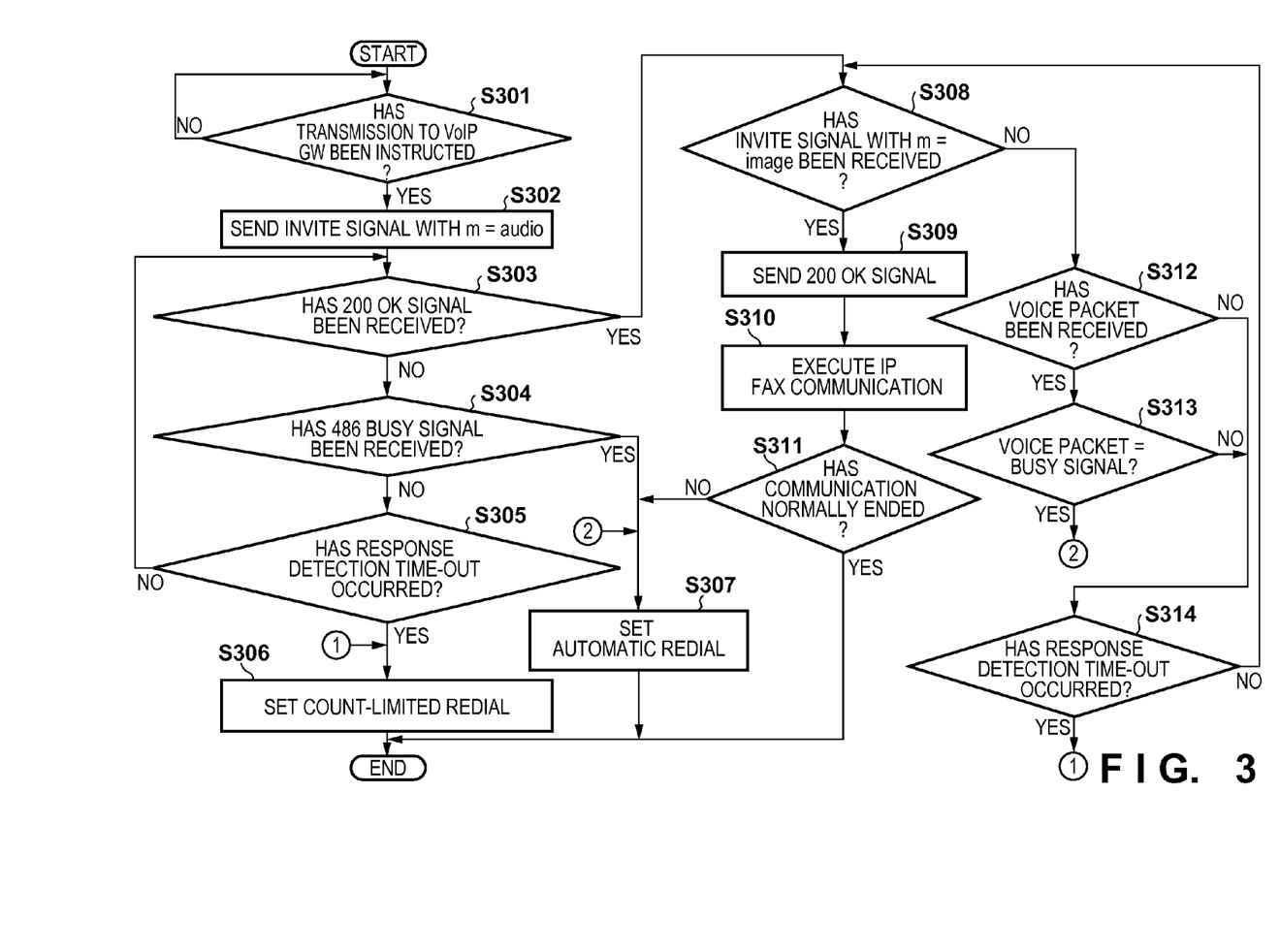
FIG. 3 is a flowchart illustrating processing when an image communicating apparatus performs, via a VoIP GW, FAX transmission to an image communicating apparatus connected to the PSTN.

FIG. 3 is a flowchart for explaining processing when the image communicating apparatus 100 according to the embodiment performs, via the VoIP GW 101, FAX transmission to the image communicating apparatus 103 connected to the PSTN 105. Note that a program for executing this processing is stored in the HDD 210, loaded into the RAM 209 at the time of execution, and executed under the control of the CPU 201.

In step S301, the CPU 201 determines whether transmission to the VoIP GW 101 has been instructed. For example, the CPU 201 determines whether a transmission start instruction has been issued by placing a transmission document on the scanner unit 204, designating a transmission destination in the operation unit 203, and operating a transmission start button or the like in the operation unit 203. If it is determined in step S301 that a transmission start instruction has been issued, the process advances to step S302, and the CPU 201 sends a SIP INVITE signal to the IP network 106. As for the processing of sending the signal from the image communicating apparatus 100 to the IP network 106, basically, a signal generated by the IP packet generation/analysis unit 206 is sent to the IP network 106 via the network I/F unit 215 in response to an instruction of the CPU 201. The sending operation is as described above and a repetitive description thereof will be omitted.

Figure 6:
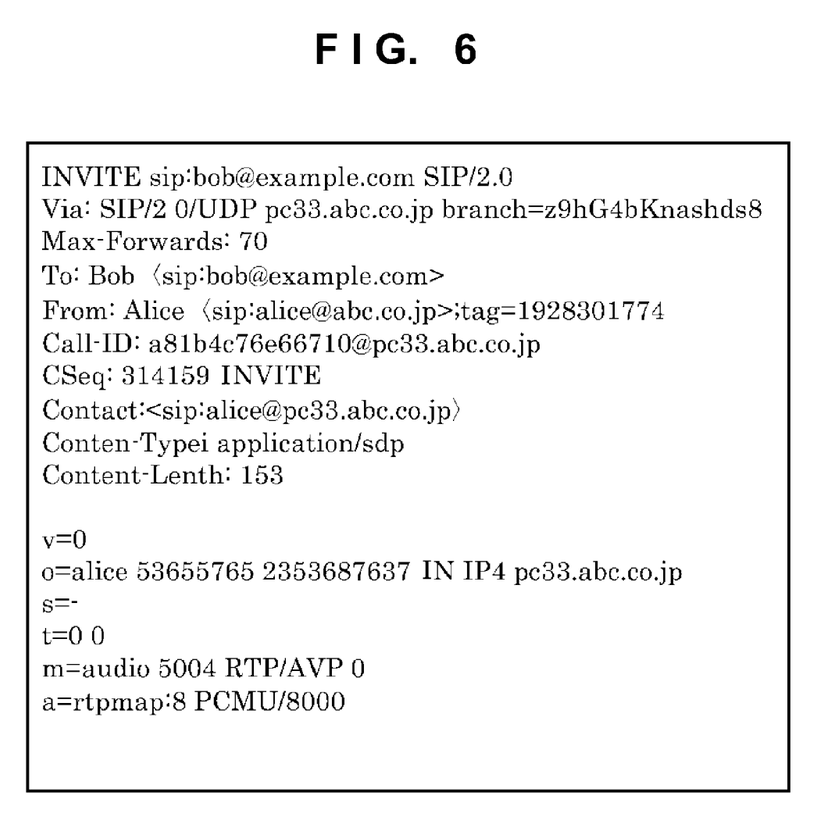
FIG. 6 is a view showing an example of an INVITE signal sent in step S302 of FIG. 3.

FIG. 6 is a view showing an example of the INVITE signal sent in step S302.

In the example of the signal shown in FIG. 6, a destination is indicated after "To:", a transmission source is indicated after "FROM:", and a medium attribute is indicated after "m=audio". In the example of FIG. 6, m=audio and RTP (Real Time Protocol) as a communication protocol are indicated. A description associated with encoding of a voice signal is provided after "a=" on the last row. In this example, "8 PCMU/8000" indicates that the number of code bits of PCM (Pulse Coded Modulation) encoding is 8 and the code sampling frequency is 8000.

As described above, a call is originated for a voice medium first, and the CPU 201 waits for a response signal from the VoIP GW 101 in step S303. If the CPU 201 determines in step S303 that a SIP 200 OK signal has been received, a voice call has been connected, and thus the process advances to step S308. The signal from the IP network 106 is basically received when the IP packet generation/analysis unit 206 analyzes the signal received from the IP network 106 via the network I/F unit 215, and the CPU 201 determines the analysis result. The reception operation is as described above and a repetitive description thereof will be omitted.

In step S308, the CPU 201 waits for reception of an INVITE signal from the VoIP GW 101. If it is determined that the received signal is an INVITE signal with an medium attribute "image", the process advances to step S309, and the CPU 201 sends a SIP 200 OK signal to the IP network 106. This allows IP FAX communication between the image communicating apparatus 100 and the VoIP GW 101. In step S310, the CPU 201 executes IP FAX communication. The process advances to step S311, and the CPU 201 determines whether communication has abnormally ended or normally ended. If communication has normally ended, the process ends. As for the determination processing, the signal received from the IP network 106 is sent to the IP packet generation/analysis unit 206 via the network I/F unit 215, and a T.38 signal is extracted from a packet signal. The extracted signal is then sent to the T.38 protocol generation/analysis unit 214 and analyzed, thereby determining whether communication has normally ended. On the other hand, if the CPU 201 determines in step S311 that communication has abnormally ended, the process advances to step S307 to set the automatic redial, thereby terminating the process.

After the call is disconnected, the redial set in step S307 is executed by setting the number of times and interval (for example, the redial count: 2 and the redial interval: 2 min) according to a user instruction.

Figure 7:
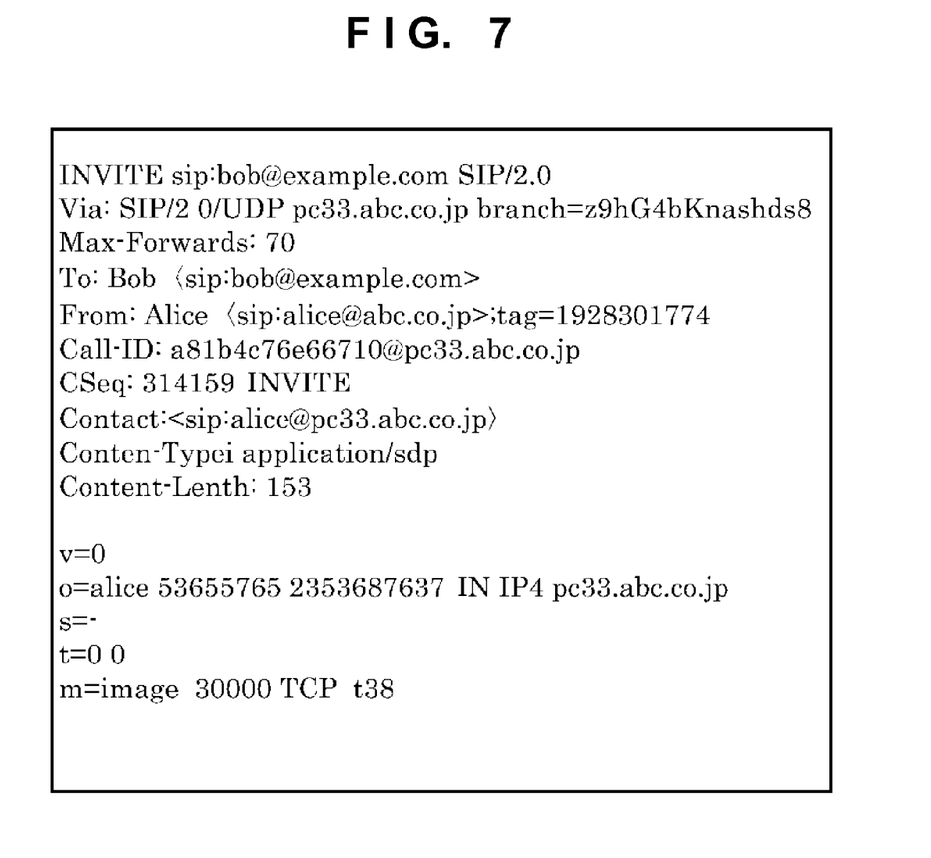
FIG. 7 is a view showing an example of an INVITE signal received from the VoIP GW in step S303 of FIG. 3.

FIG. 7 is a view showing an example of the INVITE signal received from the VoIP GW 101 in step S303 of FIG. 3.

In the INVITE signal, contents of "To:" and "FROM:" are the same as those in the above-described INVITE signal but "m=image" represents that a medium to be communicated is data. The signal following "m=" indicates that the medium has been changed in the INVITE signal.

On the other hand, if it is determined in step S303 that no SIP 200 OK signal has been received from the VoIP GW 101, the process advances to step S304 and the CPU 201 determines whether a SIP 486 busy signal has been received. If it is determined that a 486 busy signal has been received, the CPU 201 determines that the transmission destination device is in use (busy), and advances the process to step S307 to set the automatic redial, thereby terminating the process. This operation is performed when it is determined that the transmission destination device is in use (busy) by detecting a SIP 486 busy signal, as shown in FIG. 9.

If the CPU 201 determines in step S304 that no 486 busy signal has been detected, the process advances to step S305, and the CPU 201 determines whether a response signal waiting time has elapsed (a transmission time-out has occurred). If the CPU 201 determines that a transmission time-out has occurred, the transmission destination device may not be a communication terminal. Thus, the process advances to step S306 and the CPU 201 sets the count-limited redial, thereby terminating the process. If the CPU 201 detects no transmission time-out in step S305, the process returns to step S303 to continue detecting a response signal.

If the CPU 201 determines in step S308 that no SIP INVITE signal has been received from the VoIP GW 101, the process advances to step S312 and the CPU 201 determines whether a voice packet has been received. Since a voice packet is received by RTP (Real Time Protocol), this determination processing is performed by checking the protocol of the received packet. If the CPU 201 determines that no voice packet has been received, the process advances to step S314, and the CPU 201 determines whether a transmission time-out has occurred. If the CPU 201 determines that no transmission time-out has occurred, the process returns to step S308. On the other hand, if the CPU 201 detects a transmission time-out in step S314, the process advances to step S306 and the CPU 201 sets the count-limited redial. Note that if the process advances to step S306, this indicates that no effective signal has been received from the transmission destination device, and it is possible to determine that the transmission destination device is not a communication terminal. Therefore, the count-limited redial is set, and the redial count is limited to one without considering a user setting value.

If the CPU 201 determines in step S312 that a voice packet has been detected, the process advances to step S313, and the CPU 201 analyzes a voice signal of the voice packet, and determines whether the voice signal is a busy tone. If the CPU 201 determines that the voice signal is a busy tone, the process advances to step S307, and the CPU 201 sets the automatic redial. On the other hand, if the CPU 201 cannot detect a busy tone in step S313, the process advances to step S314 to repeat the processes in step S308 and subsequent steps until a transmission time-out occurs.

The busy tone determination processing in step S313 will now be described.

The voice signal of RTP received from the IP network 106 is sent to the voice signal processing unit 213 via the network I/F unit 215. The voice signal processing unit 213 includes a filter of extracting the voice signal (for example, the above-described PCM signal) from the voice packet of RTP, and detecting the frequency of the signal. In this embodiment, this filter is a digital filter adopting fast Fourier transform and uses dedicated hardware but may be executed in calculation processing by the CPU 201. The CPU 201 reads out the frequency of the voice data detected by the voice signal processing unit 213, and also detects the cadence of the voice signal. The cadence indicates the ON-OFF interval of the signal, and the CPU 201 detects the cadence by monitoring an output from the voice signal processing unit 213 using a timer or the like. If the frequency and cadence of the voice signal detected by the CPU 201 indicate a busy tone (in Japan, the cadence of 0.5-sec ON/0.5-sec OFF of a 400-Hz sinusoidal wave), the CPU 201 determines that the voice signal is a busy tone. If the CPU 201 determines in step S313 that a busy tone has been received by the voice packet, the process advances to step S307 to set the normal automatic redial, thereby terminating the process. This operation is performed when, based on the voice packet from the VoIP GW 101 instead of a SIP 486 busy signal, it is determined that the transmission destination device is in use (busy) after a voice call is established, as shown in FIG. 5.

Figure 5:
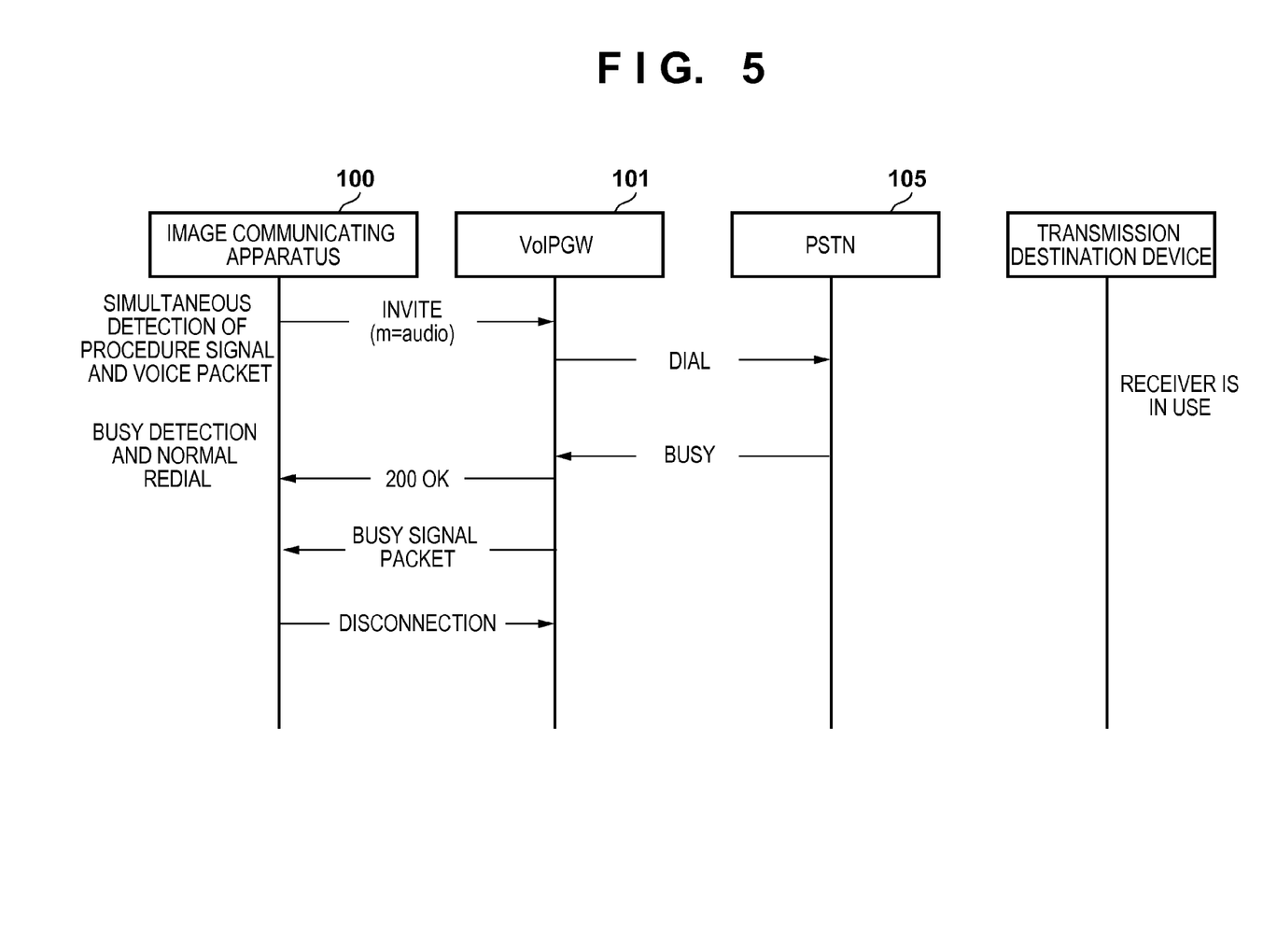
FIG. 5 is a sequence chart showing busy detection processing using a voice packet in the image communicating apparatus.

FIG. 5 is a sequence chart showing busy detection processing using a voice packet in the image communicating apparatus according to the embodiment.

As will be apparent by comparison with FIG. 9, instead of a SIP 486 busy signal, a 200 OK signal is received from the VoIP GW 101 in response to a busy signal from the PSTN 105, and then it is determined based on a voice packet from the VoIP GW 101 that the transmission destination device is busy.

A redial operation by the image communicating apparatus according to the embodiment will be described with reference to the flowchart of FIG. 4.

Figure 4:
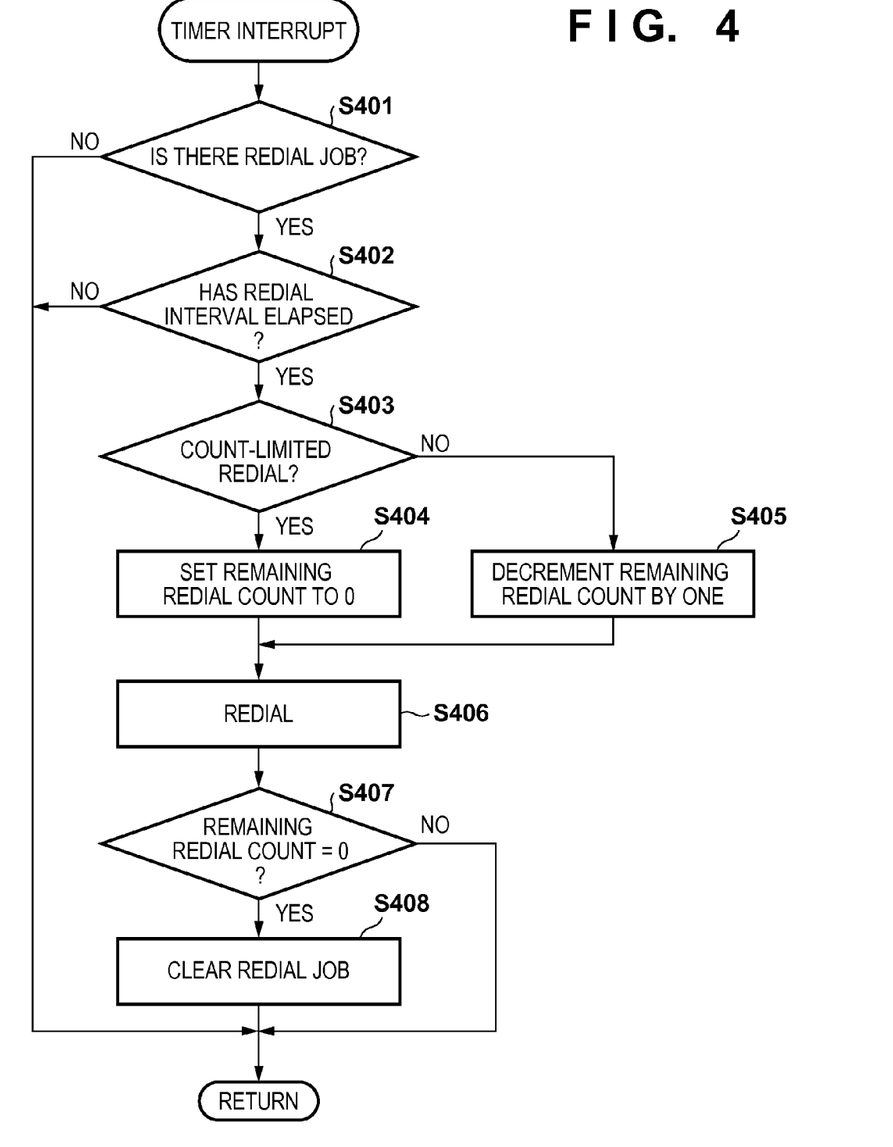
FIG. 4 is a flowchart illustrating a redial operation by the image communicating apparatus.

FIG. 4 is a flowchart for explaining a redial operation by the image communicating apparatus according to the embodiment. Note that a program for executing this processing is stored in the HDD 210, loaded into the RAM 209 at the time of execution, and executed under the control of the CPU 201.

This processing is activated by a timer interrupt signal output from an RTC (not shown) or the like for every predetermined time (for example, every 100 ms). In step S401, the CPU 201 determines whether there is a redial job. If the CPU 201 determines that there is no job, the process ends; otherwise, the process advances to step S402. In step S402, the CPU 201 determines whether a redial time interval set by the user has elapsed. This determination processing is performed by comparing the current time with the time at which the redial job was set by the CPU 201 or performed based on the number of interrupts after the redial was performed last time or the like. In this case, the CPU 201 stores the number of interrupts in the RAM 209 for each timer interrupt. If, for example, the redial time interval is 2 min, when the count value reaches "1200", the CPU 201 determines that the redial time interval has elapsed.

If the CPU 201 determines in step S402 that the redial time interval has not elapsed, the process ends. If the CPU 201 determines in step S402 that the redial time interval has elapsed, the process advances to step S403. In step S403, the CPU 201 determines whether the set redial job is the count-limited redial or automatic redial. This determination processing is performed by causing the CPU 201 to hold the type of the set redial in the RAM 209 in step S306 or S307 of FIG. 3, and to read out the held information in step S403.

If the CPU 201 determines in step S403 that the count-limited redial has been set, the process advances to step S404 to cause the CPU 201 to forcibly set the remaining redial count to 0, and then advances to step S406. On the other hand, if the CPU 201 determines in step S403 that the count-limited redial has not been set, the process advances to step S405 to cause the CPU 201 to decrement the remaining redial count by one, and then advances to step S406. In step S406, the CPU 201 redials. Then, the process advances to step S407, and the CPU 201 determines whether the remaining redial count is "0". If the CPU 201 determines that the remaining redial count is "0", it clears the redial job, thereby terminating the process. On the other hand, if the CPU 201 determines that the remaining redial count is not "0", it may redial again, and thus terminates the process without clearing the redial job. Note that the redial job is cleared in step S406 even if retransmission by redial succeeds.

As described above, according to this embodiment, it is possible to determine that the transmission destination device is in use (busy) in a voice call by detecting a busy tone received as a voice signal instead of a SIP busy signal. If it is determined that the transmission destination device is in use (busy), it is possible to execute the normal automatic redial function instead of the count-limited redial function, thereby improving the probability that it is possible to establish communication with the transmission destination device by redial.

The present invention is not limited to the above embodiment and various changes and modifications can be made without departing from the spirit and scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041051, filed Mar. 3, 2014, which is hereby incorporated by reference herein in its entirety.

What is claimed is:

1. A communication apparatus which is able to communicate with an external apparatus via an IP-network by a facsimile, the communication apparatus comprising:
    a redial unit configured to perform either a first redial process or a second redial process, wherein the first redial process redials a maximum number of times which is predetermined to a user, and the second redial process redials once irrespective of the maximum number of times which is predetermined to the user; and
    a control unit configured to control the redial unit to perform the first redial process in a case where the communication apparatus receives a SIP busy signal indicating that the external apparatus is in use or a voice packet indicating that the external apparatus is in use, and to control the redial unit to perform the second redial process in a case where the communication apparatus does not receive either the SIP busy signal or the voice packet and a time-out occurs.

2. The communication apparatus according to claim 1, wherein the communication apparatus is a printing apparatus.

3. A communication apparatus which is able to communicate with an external apparatus via an IP-network by a facsimile, the communication apparatus comprising:
    a redial unit configured to perform a redial process for redialing a maximum number of times which is predetermined to a user; and
    a determination unit configured to determine whether to perform the redial process,
    wherein the determination unit determines to perform the redial process in a case where the communication apparatus receives a SIP busy signal indicating that the external apparatus is in use or a voice packet indicating that the external apparatus is in use, and
    wherein the determination unit determines not to perform the redial process in a case where the communication apparatus does not receive either the SIP busy signal or the voice packet and a time-out occurs.

4. The communication apparatus according to claim 3, wherein the communication apparatus is a printing apparatus.

5. A communication method for a communication apparatus which is able to communicate with an external apparatus via an IP-network by a facsimile, the communication method comprising:
    a redial step to perform either a first redial process or a second redial process, wherein the first redial process redials a maximum number of times which is predetermined to a user, and the second redial process redials once irrespective of the maximum number of times which is predetermined to the user; and
    a control step to control the redial step to perform the first redial process in a case where the communication method receives a SIP busy signal indicating that the external apparatus is in use or a voice packet indicating that the external apparatus is in use, and to control the redial step to perform the second redial process in a case where the communication apparatus does not receive either the SIP busy signal or the voice packet and a time-out occurs.

6. A non-transitory computer readable medium storing a program for performing a communication method for a communication apparatus which is able to communicate with an external apparatus via an IP-network by a facsimile, the communication method comprising:
- a redial step to perform either a first redial process or a second redial process, wherein the first redial process redials a maximum number of times which is predetermined to a user, and the second redial process redials once irrespective of the maximum number of times which is predetermined to the user; and
- a control step to control the redial step to perform the first redial process in a case where the communication method receives a SIP busy signal indicating that the external apparatus is in use or a voice packet indicating that the external apparatus is in use, and to control the redial step to perform the second redial process in a case where the communication apparatus does not receive either the SIP busy signal or the voice packet and a time-out occurs.

7. A communication method for a communication apparatus which is able to communicate with an external apparatus via an IP-network by a facsimile, the communication method comprising:
- a redial step to perform a redial process for redialing a maximum number of times which is predetermined to a user; and
- a determination step to determine whether to perform the redial process,
- wherein the determination step determines to perform the redial process in a case where the communication apparatus receives a SIP busy signal indicating that the external apparatus is in use or a voice packet indicating that the external apparatus is in use, and
- wherein the determination step determines not to perform the redial process in a case where the communication apparatus does not receive either the SIP busy signal or the voice packet and a time-out occurs.

8. A non-transitory computer readable medium storing a program for performing a communication method for a communication apparatus which is able to communicate with an external apparatus via an IP-network by a facsimile, the communication method comprising:
- a redial step to perform a redial process for redialing a maximum number of times which is predetermined to a user; and
- a determination step to determine whether to perform the redial process,
- wherein the determination step determines to perform the redial process in a case where the communication apparatus receives a SIP busy signal indicating that the external apparatus is in use or a voice packet indicating that the external apparatus is in use, and
- wherein the determination step determines not to perform the redial process in a case where the communication apparatus does not receive either the SIP busy signal or the voice packet and a time-out occurs.

* * * * *